United States Patent
Moser et al.

(10) Patent No.: US 10,017,243 B2
(45) Date of Patent: Jul. 10, 2018

(54) ADAPTIVE TRAILING EDGE ACTUATOR SYSTEM AND METHOD

(71) Applicant: The Boeing Company, Chicago, IL (US)

(72) Inventors: Matthew A. Moser, Marysville, WA (US); Michael R. Finn, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 14/034,946

(22) Filed: Sep. 24, 2013

(65) Prior Publication Data

US 2015/0083853 A1   Mar. 26, 2015

(51) Int. Cl.
| | |
|---|---|
| *B64C 13/50* | (2006.01) |
| *B64C 9/16* | (2006.01) |
| *B64C 13/28* | (2006.01) |
| *B64C 3/14* | (2006.01) |

(52) U.S. Cl.
CPC ............... *B64C 13/50* (2013.01); *B64C 9/16* (2013.01); *B64C 13/28* (2013.01); *B64C 2003/145* (2013.01); *Y02T 50/12* (2013.01); *Y02T 50/32* (2013.01)

(58) Field of Classification Search
CPC ......... B64C 13/24; B64C 13/28; B64C 13/32; B64C 13/34; B64C 13/50
See application file for complete search history.

(56) References Cited

U.S. PATENT DOCUMENTS

| | | | | |
|---|---|---|---|---|
| 2,137,879 A | * | 11/1938 | Ksoll | B64C 9/16 244/215 |
| 2,146,014 A | * | 2/1939 | Grant | B64C 3/50 244/216 |
| 2,254,304 A | * | 9/1941 | Miller | B64C 13/00 244/216 |
| 2,524,605 A | * | 10/1950 | Servanty | 244/216 |
| 3,819,133 A | * | 6/1974 | Lee | B64C 9/16 244/216 |
| 3,822,047 A | * | 7/1974 | Schuldt, Jr. | 244/181 |
| 4,049,219 A | * | 9/1977 | Dean | B64C 9/20 244/217 |
| 4,582,278 A | * | 4/1986 | Ferguson | B64C 3/46 244/219 |

(Continued)

FOREIGN PATENT DOCUMENTS

| | | |
|---|---|---|
| DE | 102007027137 | 12/2008 |
| DE | 102010021576 | 12/2011 |

(Continued)

OTHER PUBLICATIONS

European Search Report for 14185991.8, dated Feb. 4, 2015.

(Continued)

*Primary Examiner* — Tien Q Dinh
*Assistant Examiner* — Steven Hawk

(57) ABSTRACT

An adaptive trailing edge system for an aircraft may include an adaptive trailing edge element mounted to a trailing edge. An electric motor actuator having an electric motor may be configured to actuate the adaptive trailing edge element. A linkage system may couple the electric motor actuator to the adaptive trailing edge element for actuation thereof.

15 Claims, 11 Drawing Sheets

(56) References Cited

U.S. PATENT DOCUMENTS

| | | | | |
|---|---|---|---|---|
| 4,702,442 | A * | 10/1987 | Weiland | B64C 9/16 244/216 |
| 4,725,026 | A * | 2/1988 | Krafka et al. | 244/219 |
| 4,796,840 | A * | 1/1989 | Heynatz | B64C 9/16 244/213 |
| 4,838,503 | A * | 6/1989 | Williams | 244/214 |
| 5,098,043 | A * | 3/1992 | Arena | B64C 13/26 244/215 |
| 5,651,513 | A * | 7/1997 | Arena | 244/99.3 |
| 5,839,699 | A * | 11/1998 | Bliesner | 244/214 |
| 5,884,872 | A * | 3/1999 | Greenhalgh | 244/201 |
| 6,010,097 | A * | 1/2000 | Cox | 244/216 |
| 6,123,297 | A * | 9/2000 | Berry | B64C 3/50 244/214 |
| 6,152,405 | A * | 11/2000 | Muller | 244/219 |
| 6,152,692 | A * | 11/2000 | Aubry | 416/24 |
| 6,241,182 | B1 | 6/2001 | Durandeau | |
| 6,467,733 | B1 * | 10/2002 | Young | B64C 9/16 244/213 |
| 6,481,667 | B1 * | 11/2002 | Ho | B64C 3/48 244/213 |
| 7,048,234 | B2 | 5/2006 | Recksiek | B64C 13/503 244/213 |
| 7,367,532 | B2 * | 5/2008 | Libby | B64C 3/50 244/198 |
| 7,494,094 | B2 * | 2/2009 | Good et al. | 244/215 |
| 7,594,796 | B2 * | 9/2009 | De La Grandmaison et al. | 416/24 |
| 7,641,152 | B2 * | 1/2010 | Onu et al. | 244/194 |
| 7,726,610 | B2 * | 6/2010 | Good et al. | 244/217 |
| 7,992,825 | B2 * | 8/2011 | Llamas Sandin | B64C 9/00 244/211 |
| 8,356,766 | B2 * | 1/2013 | Garthaffner | 242/437.3 |
| 8,424,810 | B1 * | 4/2013 | Shmilovich et al. | 244/214 |
| 8,567,727 | B2 * | 10/2013 | Morris | B64C 9/26 244/211 |
| 8,714,493 | B2 * | 5/2014 | Morris | B64C 9/26 244/213 |
| 9,573,676 | B2 * | 2/2017 | Dyckrup | B64C 9/02 |
| 2003/0057332 | A1 * | 3/2003 | Schwetzler et al. | 244/203 |
| 2006/0049308 | A1 * | 3/2006 | Good et al. | 244/76 A |
| 2006/0202089 | A1 * | 9/2006 | Reckzeh | B64C 9/20 244/215 |
| 2007/0098554 | A1 * | 5/2007 | Lorin De La Grandmaison et al. | 416/131 |
| 2010/0308162 | A1 * | 12/2010 | Gartelmann | B64C 9/20 244/99.3 |
| 2011/0127385 | A1 * | 6/2011 | Morris | 244/216 |
| 2013/0327887 | A1 * | 12/2013 | Dyckrup | B64C 9/02 244/99.9 |

FOREIGN PATENT DOCUMENTS

| | | |
|---|---|---|
| EP | 0909705 | 4/1999 |
| EP | 0909705 A2 | 4/1999 |
| EP | 1780121 | 5/2007 |
| EP | 1780121 A1 | 5/2007 |
| FR | 2770826 A1 | 5/1999 |

OTHER PUBLICATIONS

Airbus, "Getting to Grips with Aircraft Performance," Jan. 2002.
Delta Virtual Airlines, "Boeing 777-200ER Aircraft Operating Manual," Nov. 2005.
The Boeing Company, "777 Flight Crew Operations Manual," Dec. 15, 2003.
FAA CLEEN Program Briefing, "Continuous Lower Energy, Emissions and Noise (CLEEN) Technologies Development," Oct. 27, 2010.
FAA CLEEN Program Briefing, "Continuous Lower Energy, Emissions and Noise (CLEEN) Technologies Development—Boeing Program Update," Nov. 2, 2011.
Canadian Intellectual Property Office, Office Action for Application No. 2,857,892, dated Oct. 19, 2015.
European Search Report for 14185991.8, dated Jun. 7, 2016.
European Search Report for 14185991.8, dated Apr. 21, 2017.
Canadian Search Report for Appl.No. 2,857,892, dated May 17, 2017.
Canadian Office Action for Appl. No. 2,857,892, dated Sep. 2, 2016.

* cited by examiner

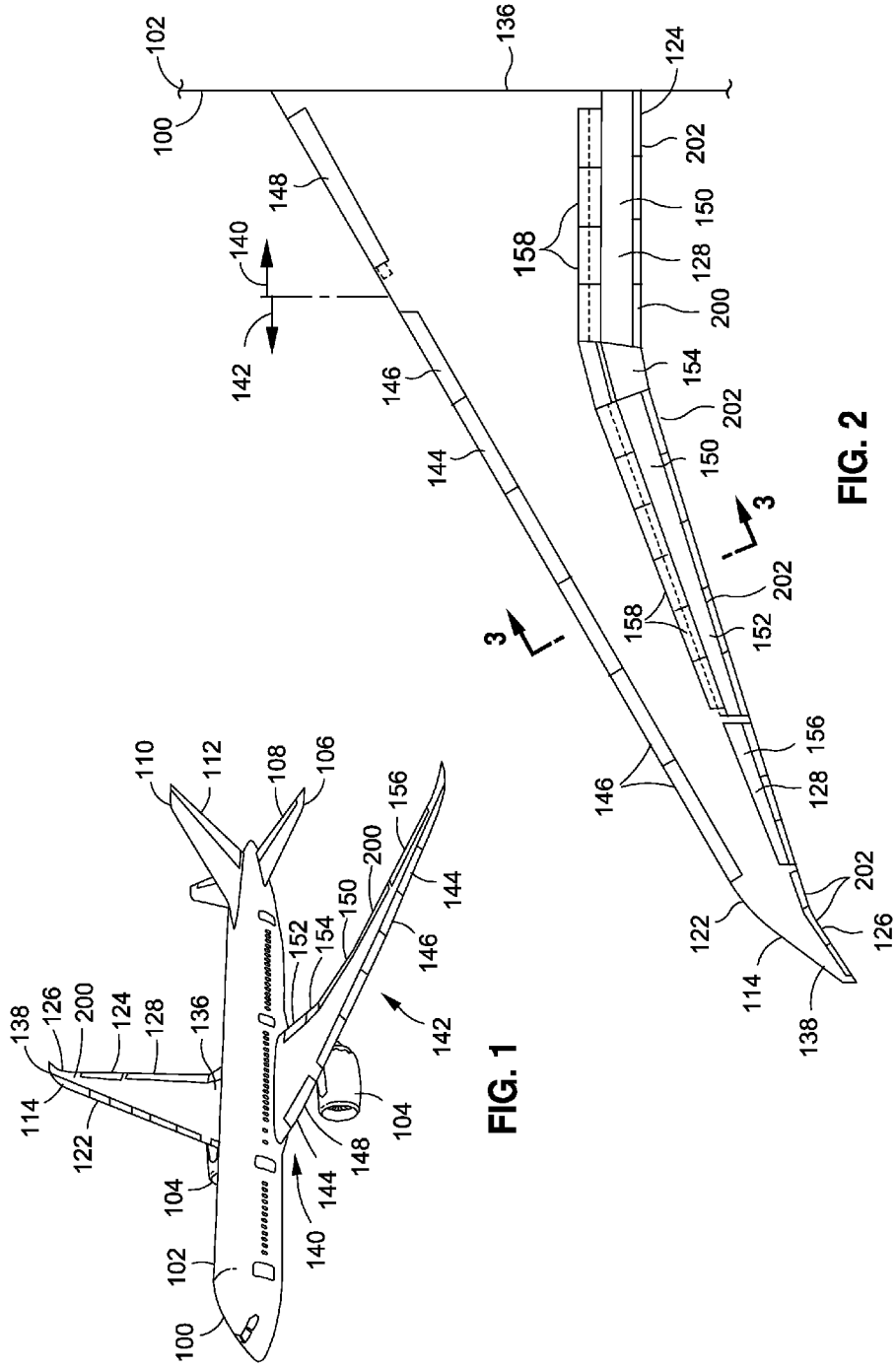

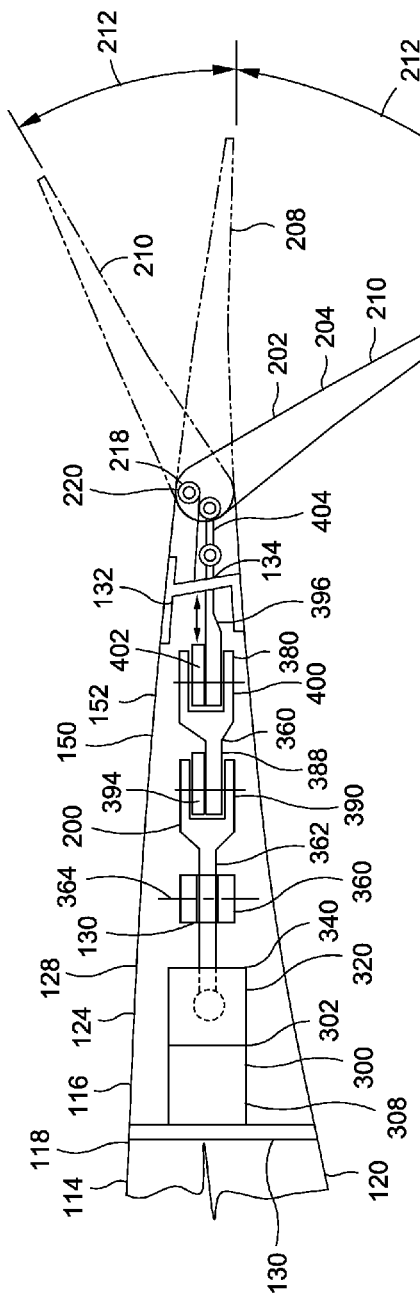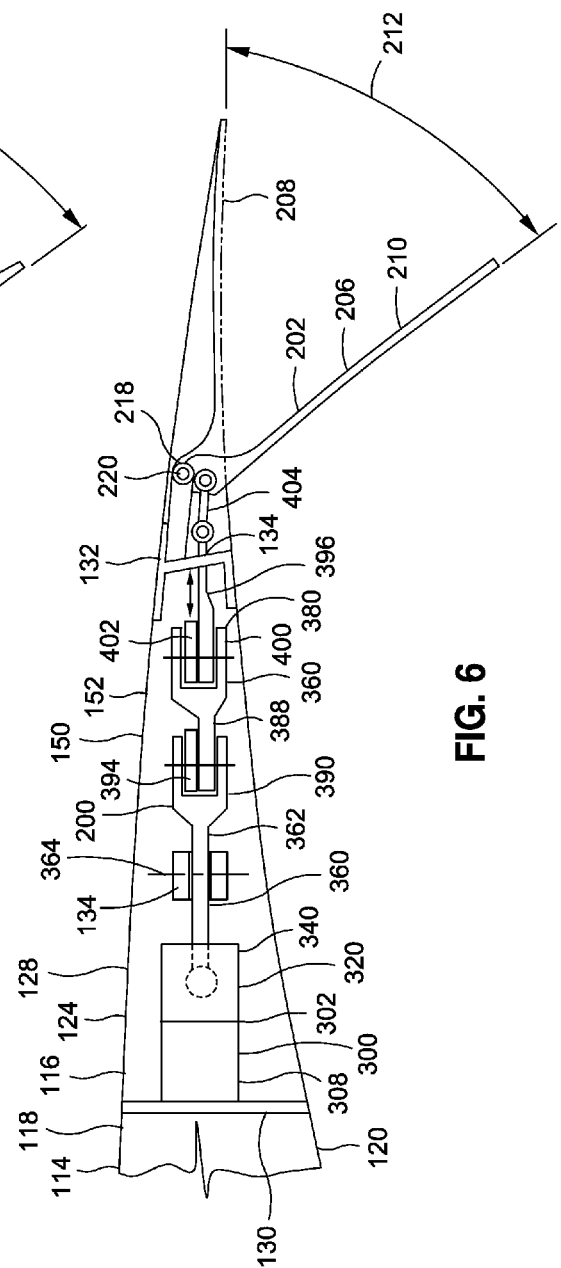
FIG. 5
FIG. 6

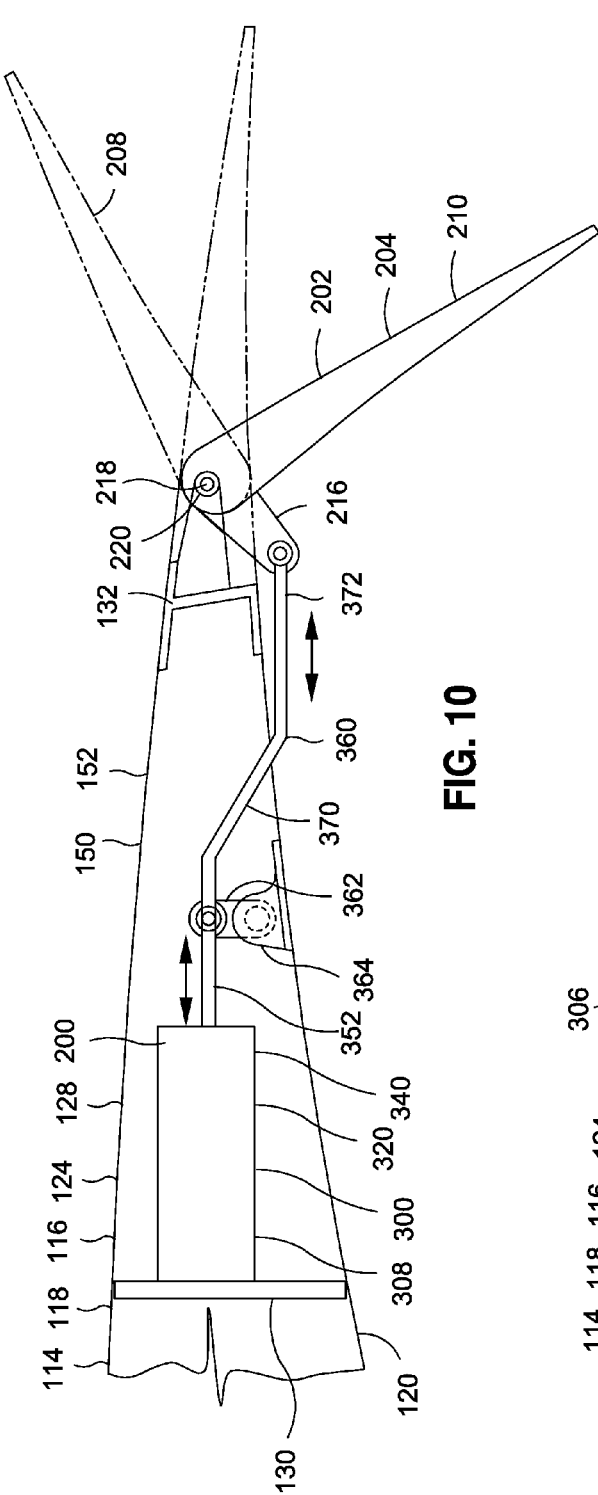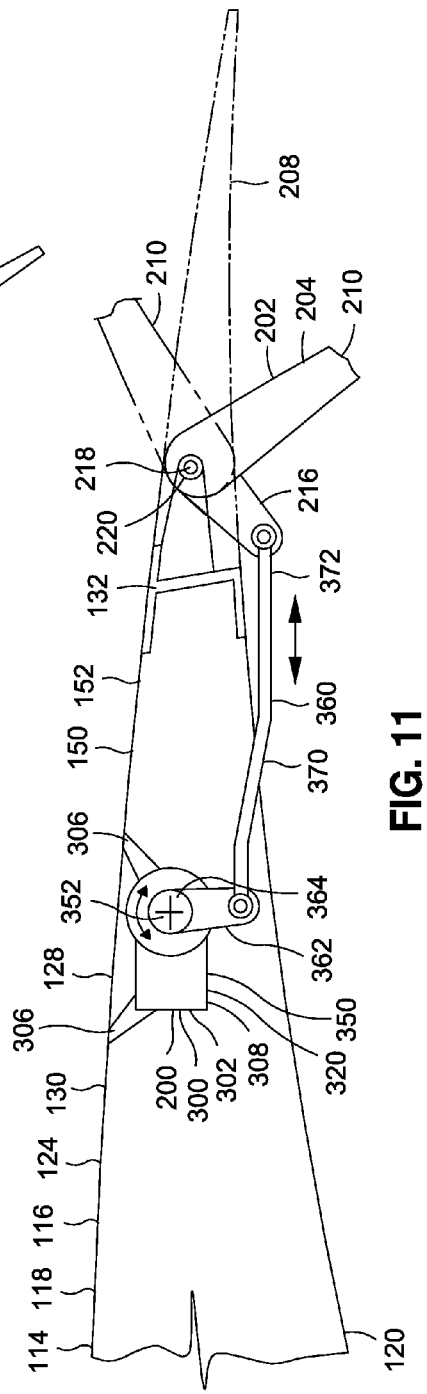

ADAPTIVE TRAILING EDGE ACTUATOR SYSTEM AND METHOD

FIELD

The present disclosure relates generally to aircraft control surfaces and, more particularly, to the actuation of adaptive trailing edge elements.

BACKGROUND

Aircraft such as commercial airliners typically include control surfaces or devices mounted on the wings to improve the aerodynamic performance of the aircraft. Such control surfaces include wing leading edge devices and wing trailing edge devices and which may be deflected to improve the lift and/or drag characteristics of the wings. In addition, control surfaces such as miniature flaps may be mounted on the wing trailing edges and which may be deflected to increase the wing lift coefficient, alter the sectional pressure distribution, maintain airflow over the wing upper surface at high angles of attack, and other advantages. For example, miniature flaps may be deflected downwardly during cruise flight to increase the wing lift coefficient without significantly increasing aerodynamic drag which may improve the aerodynamic efficiency of the wings resulting in reduced fuel consumption and/or increased range. Miniature flaps may also maintain attachment of the airflow over the wing surface at high angles of attack which may reduce the aircraft stall speed.

Under certain flight conditions, it may be desirable to retract the miniature flaps from a deflected position back toward a neutral position. For example, for an aircraft encountering wind shear, it may be desirable to quickly retract the miniature flaps to avoid overloading the wing structure. For an aircraft moving at 500 to 600 miles per hour typical of cruise flight, it may be necessary to retract the miniature flaps in a relatively short period of time (e.g. within several seconds). It may also be desirable to deflect the miniature flaps upwardly during certain phases of flight to increase the aerodynamic performance of the wings. For example, upward deflection of the miniature flaps may improve the sectional lift characteristics of the wings.

One mechanism for actuating miniature flaps includes a shape memory alloy actuator. Unfortunately, shape memory alloy actuators are limited to deflecting flaps in a single direction, and rely on relatively slow cooling of the shape memory alloy material by ambient air to retract or move the miniature flaps in an opposite direction. In addition, shape memory alloy actuators have relatively slow actuation rates which may present challenges in quickly retracting the miniature flaps to prevent overloading the wings during certain flight conditions. Even further, shape memory alloy actuators have inherently low stiffness such that shape memory alloy actuators may be incapable of reacting aerodynamic loads on the miniature flaps. The inherently low stiffness of shape memory alloy actuators may lead to challenges in controlling flutter of the miniature flaps.

As can be seen, there exists a need in the art for a system and method of actuating miniature flaps which is capable of actuating such miniature flaps in opposite directions, is inherently stiff for reacting aerodynamic loads and minimizing flutter, and which allows for quick actuation and/or retraction of the miniature flaps.

SUMMARY

The above-noted needs associated with the actuation of miniature flaps may be addressed and alleviated by the present disclosure which provides an adaptive trailing edge system for an aircraft and which may include an adaptive trailing edge element mounted to a trailing edge. An electric motor actuator having an electric motor may be configured to actuate the adaptive trailing edge element. A linkage system may couple the electric motor actuator to the adaptive trailing edge element for actuation thereof.

In a further embodiment, disclosed is an aircraft having a wing. The aircraft may include an adaptive trailing edge element mounted to a trailing edge of the wing. The aircraft may include an electric motor actuator having an electric motor configured to actuate the adaptive trailing edge element, and a linkage system coupling the electric motor actuator to the adaptive trailing edge element for actuation thereof.

Also disclosed is a method of actuating an adaptive trailing edge. The method may include providing an adaptive trailing edge element mounted to a trailing edge of a wing of an aircraft. The method may additionally include activating an electric motor actuator coupled to the adaptive trailing edge element by a linkage system. The method may also include actuating the adaptive trailing edge in response to activating the electric motor.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective view of an aircraft;

FIG. 2 is a plan view of an aircraft wing having a plurality of adaptive trailing edge elements mounted to the trailing edge of the wing;

FIG. 5 is a diagrammatic sectional view of the adaptive trailing edge system taken along line 5 of FIG. 4 and illustrating the electric motor actuator coupled to a miniplain flap embodiment of an adaptive trailing edge element;

FIG. 6 is a diagrammatic sectional view of an embodiment of the adaptive trailing edge system in which the adaptive trailing edge element is configured as a mini split flap;

FIG. 10 is a diagrammatic sectional view of an embodiment of the adaptive trailing edge system including a ball screw actuator operatively coupled to an adaptive trailing edge element by a linkage system configured as a pivot mechanism;

FIG. 11 is a diagrammatic sectional view of a further embodiment of the adaptive trailing edge system including a rotary actuator operatively coupled to the adaptive trailing edge elements by a pivot mechanism;

DETAILED DESCRIPTION

Figure 3:
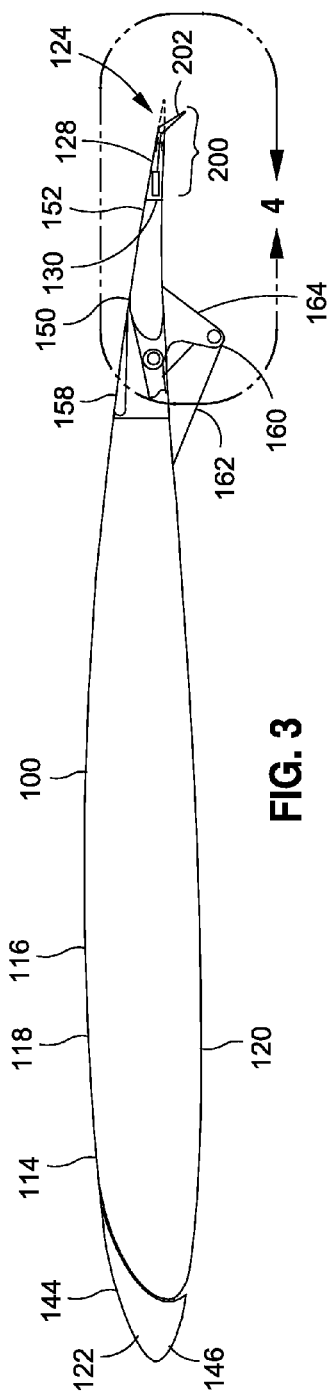
FIG. 3 is a diagrammatic sectional view of the wing taken along line 3 of FIG. 2 and illustrating an adaptive trailing edge system mounted to a trailing edge of a trailing edge flap.

Referring now to the drawings wherein the showings are for purposes of illustrating various embodiments of the present disclosure, shown in FIG. 1 is a perspective view of an aircraft 100. The aircraft 100 may include a fuselage 102 having a pair of wings 114. Each wing 114 may be attached to the fuselage 102 at a wing root 136 and may extend outwardly toward a wing tip 138. One or more propulsion units 104 may be mounted to the wings 114. The aircraft 100 may further include an empennage including a horizontal tail 106 and elevator 108, and a vertical tail 110 and rudder 112 for directional control of the aircraft 100. The aircraft 100 may optionally include one or more wing leading edge devices 144 and one or more wing trailing edge devices 150.

In FIG. 2, shown is an embodiment of an aircraft 100 wing 114 having inboard 140 and outboard 142 leading edge devices 144 mounted to the wing leading edge 122, and inboard 140 and outboard 142 trailing edge devices 150 mounted to the wing trailing edge 124. In the embodiment shown, the inboard 140 leading edge device 144 may be configured as one or more Krueger flaps 148, and the outboard 142 leading edge devices 144 may be configured as one or more leading edge slats 146, although the leading edge devices 144 may be provided in any configuration. The inboard 140 trailing edge devices 150 may include a trailing edge flap 152, and an inboard 140 roll-control flap device, which may be configured as a flaperon 154 (e.g. a combination flap-aileron). The outboard 142 trailing edge devices 150 may include one or more outboard 142 trailing edge flaps 152, and an outboard 142 roll-control device such as an aileron 156. The wings 114 may include spoilers 158 for decelerating the aircraft 100 during flight, and/or to reduce aerodynamic lift of the wings 114 such as upon touchdown when the aircraft 100 is landing.

In FIG. 2, the aircraft 100 may further include an adaptive trailing edge system 200 having at least one electric motor actuator 300 (see e.g., FIG. 4) including an electric motor 308 for actuating one or more adaptive trailing edge elements 202. One or more adaptive trailing edge elements 202 may be mounted to a fixed trailing edge 126 of the wing 114, and/or one or more adaptive trailing edge elements 202 may be mounted to a movable trailing edge of the wing 114 (e.g., an aft edge of one or more wing trailing edge devices 150). Movable trailing edges may interchangeably be referred to herein as device trailing edges 128. For example, the wing 114 may include a plurality of adaptive trailing edge elements 202 mounted in series along the device trailing edges 128 and/or along the fixed trailing edge 126 of the wing 114.

The adaptive trailing edge system 200 may be configured to adjust the spanwise load distribution on the wing 114. As shown in FIG. 2, each one of the adaptive trailing edge elements 202 may be actuated by a dedicated electric motor actuator 300. In other examples, a plurality of adaptive trailing edge elements 202 may be actuated by a same dedicated electric motor actuator 300. The adaptive trailing edge elements 202 may be deflected (e.g., moved to a deflected position as will be further described) to alter the sectional aerodynamic performance of the wings 114. For example, the adaptive trailing edge elements 202 may be deflected in order to increase the wing lift coefficient, alter the sectional pressure distribution, and/or maintain airflow over the wing upper surface 118 at high angles of attack. One or more of the adaptive trailing edge elements 202 may be deflected to a position which is different from a deflected position of other ones of the adaptive trailing edge elements 202. Advantageously, in this manner, the electric motor actuators 300 may differentially deflect the adaptive trailing edge elements 202 upwardly and/or downwardly to facilitate adjustment of the spanwise load distribution on the wings 114, as described in greater detail below.

The adaptive trailing edge system 200 disclosed herein comprises a mechanical actuation system, which may have inherently high stiffness and may thus be capable of reacting aerodynamic loads on the adaptive trailing edge elements 202, such as during actuation of the adaptive trailing edge elements 202. Such relatively high inherent stiffness of the mechanical actuation system may advantageously simplify control laws for operating the adaptive trailing edge elements 202. In addition, the relatively high inherent stiffness of the actuation system may simplify the suppression of aerodynamically-induced vibration or flutter of the adaptive trailing edge elements 202. In any of the adaptive trailing edge system 200 embodiments disclosed herein, the adaptive trailing edge elements 202 may also include mass balancing (not shown) to control flutter. Advantageously, the mechanical electric motor actuator 300 may allow for relatively rapid retraction of deflected adaptive trailing edge elements 202 as may be desirable for maneuver load alleviation and/or gust load alleviation.

Although the adaptive trailing edge system 200 is described in the context of a tube-and-wing aircraft 100 configuration as shown in FIG. 1, the adaptive trailing edge system 200 may be implemented in any aircraft configuration, without limitation, including blended wing aircraft configurations, hybrid wing-body aircraft configurations, and other aircraft configurations. Furthermore, the adaptive trailing edge system 200 is not limited to implementation on aircraft, and may be applied to any airfoil of any type, shape, or configuration, without limitation, including airfoils in non-aircraft implementations.

In FIG. 3, shown is a cross-section of an embodiment of a wing 114 having a leading edge device 144 and a trailing edge device 150 in their neutral or stowed positions. In the embodiment shown, the leading edge device 144 is configured as a slat 146 and the trailing edge device 150 is configured as a flap 152 supported on a drop hinge 160. The drop hinge 160 may include a wing bracket 162 extending downwardly from the wing 114. The trailing edge device 150 or flap 152 may include a flap bracket 164 that may be pivotably coupled to the wing bracket 162 for pivotably moving the trailing edge device 150 upwardly and downwardly. Although shown as a simple flap 152 mounted on a drop hinge 160, the trailing edge device 150 may be provided in any one of a variety of different configurations, and is not limited to the drop hinge flap 152 shown in the FIG. 3. For example, one or more of the trailing edge devices 150 on the wing 114 may be configured as a plain flap, a single-slotted flap, a multi-slotted Fowler flap, or any one of a variety of other flap configurations to which the adaptive trailing edge system 200 may be mounted. The adaptive trailing edge system 200 may also be mounted to the above-mentioned flaperon 154 and/or aileron 156.

In FIG. 3, shown is a trailing edge device 150 incorporating an adaptive trailing edge system 200 having one or more adaptive trailing edge elements 202 mounted to the device trailing edge 128. As shown, the adaptive trailing edge element 202 has a relatively small element chord length. For example, the adaptive trailing edge element 202 may have an element chord length that is less than approximately five (5) percent of a local wing chord of the wing 114, although one or more of the adaptive trailing edge elements 202 may be provided with an element chord length that is greater than approximately five (5) percent of local wing chord. As indicated above, the adaptive trailing edge elements 202 may be deflected upwardly and/or downwardly into the airflow over the respective wing upper surface 118 and/or wing lower surface 120, and may thereby alter the section lift characteristics and/or the sectional pressure distribution of the airfoil. Due to their relatively small size, power requirements for the electric motor actuators 300 for actuating the adaptive trailing edge elements 202 may be significantly less than the power requirements for actuating conventional trailing edge devices 150 which may be approximately 10% or more of local wing chord. In this regard, the electric motor actuators 300 may advantageously retract the adaptive trailing edge elements 202 from a deflected position 210 to a neutral position 208 (e.g. a non-deflected position) in a relatively rapid manner (e.g., within approximately several seconds) for dynamic wing load adjustment such as for gust load alleviation as mentioned above.

Figure 4:
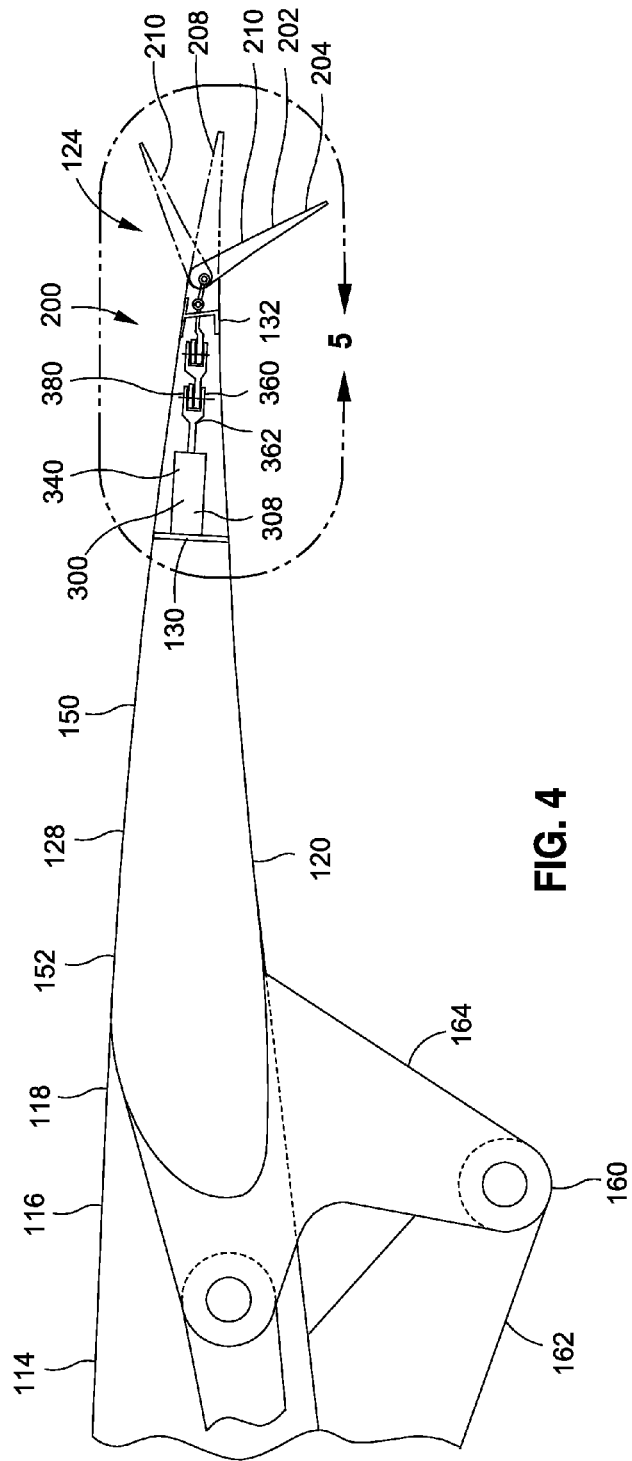
FIG. 4 is a diagrammatic sectional view of the trailing edge flap taken along line 4 of FIG. 3 and illustrating an electric motor actuator mounted within the trailing edge device for actuating the adaptive trailing edge element.

FIG. 4 shows an enlarged view of the trailing edge device 150 depicted in FIG. 3. As described above, the trailing edge device 150 includes an adaptive trailing edge system 200, which includes an adaptive trailing edge element 202 mounted to the device trailing edge 128. The electric motor actuator 300 includes the electric motor 308 as indicated above. The adaptive trailing edge system 200 may include a linkage system 360 coupling the electric motor actuator 300 to the adaptive trailing edge element 202 for actuation thereof in response to activation of the electric motor 308. Depending upon the configuration of the adaptive trailing edge 124 element, the electric motor actuators 300 may advantageously actuate the adaptive trailing edge element 202 upwardly and/or downwardly to vary the wing performance such as by improving the lift-to-drag ratio during cruise, takeoff, and landing, and for reducing aerodynamic drag, and/or reducing aircraft noise. In an embodiment, the adaptive trailing edge system 200 may be sized and configured to be contained within the trailing edge 124. For example, the electric motor actuator 300 and/or the linkage system 360 may be sized and configured to be contained within the mold line 116 of the device trailing edge 128 and/or the mold line 116 of the fixed trailing edge 126 of the wing 114.

FIG. 5 shows an embodiment of an adaptive trailing edge system 200 according to the present disclosure. As described herein, the adaptive trailing edge system 200 may include one or more adaptive trailing edge elements 202, an electric motor actuator 300, and a linkage system 360. In some embodiments, the adaptive trailing edge element 202 may be a mini-plain flap 204, e.g., as depicted in FIG. 5. In other embodiments, the adaptive trailing edge element 202 may be a mini-split flap, as will be further described with reference to FIG. 6. Other adaptive trailing edge element configurations may be used without departing from the scope of the present disclosure.

According to the embodiment in FIG. 5, the linkage system 360 may be configured as a slider mechanism 380 coupling the electric motor actuator 300 to a mini-plain flap 204 embodiment of the adaptive trailing edge 124. In the embodiment shown, the electric motor actuator 300 and the slider mechanism 380 may be contained within the trailing edge 124 which may avoid the need for a separate aerodynamic fairing (not shown) that may otherwise be required if the electric motor actuator 300 and/or the slider mechanism 380 protruded beyond the mold line 116 of the trailing edge 124. The electric motor actuator 300 may be mounted to a trailing edge structure 130 of a movable trailing edge 124 device, or to a trailing edge structure 130 of a fixed trailing edge (not shown) of the wing 114. The electric motor actuator 300 may be configured to actuate the mini-plain flap 204 in opposing directions from a neutral position 208 of the mini-plain flap 204 to an upwardly deflected position 210 and/or to a downwardly deflected position 210. Furthermore, the electric motor actuator 300 may be configured to selectively deflect the mini-plain flap 204 upwardly and/or downwardly into any one of a variety of discrete deflection angles 212.

In FIG. 6, shown is an embodiment of the adaptive trailing edge system 200 coupling the electric motor actuator 300 to a mini-split flap 206 embodiment of the adaptive trailing edge 124. The linkage system 360 is configured as a slider mechanism 380 coupling the electric motor actuator 300 to a mini-split flap 206 which is shown coupled to the device trailing edge 128 of the movable trailing edge device 150 (e.g., flap). However, as was indicated above, the mini-split flap 206 may be coupled to a fixed trailing edge 126 (not shown) of a wing 114. The electric motor actuator 300 may be configured to actuate the mini-split flap 206 from a neutral position 208 to one or more downwardly deflected positions 210 at any one of a variety of discrete deflection angles 212.

Figure 7:
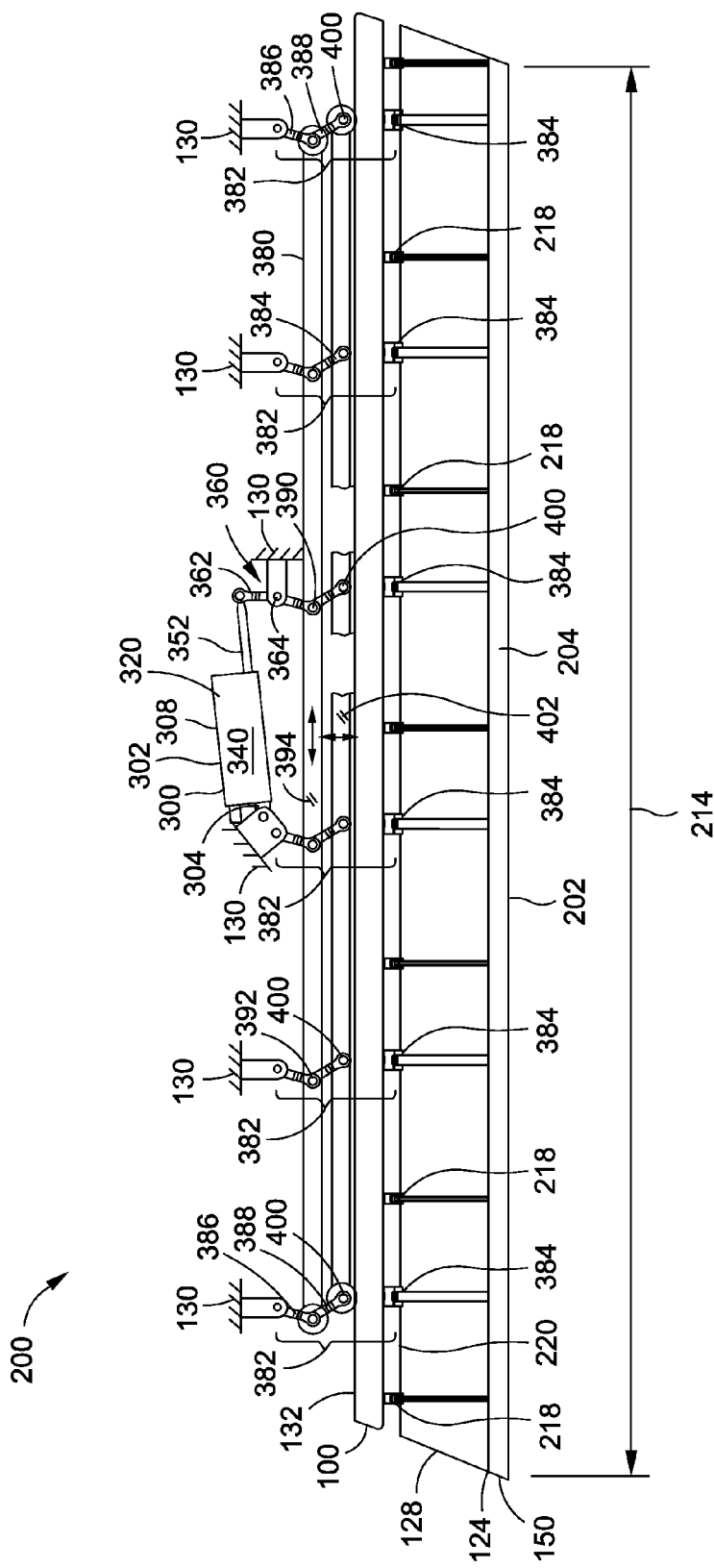
FIG. 7 is a diagrammatic plan view of an adaptive trailing edge system in which the electric motor actuator is configured as a ball screw actuator coupled to the adaptive trailing edge element by a slider mechanism.
Figure 8:
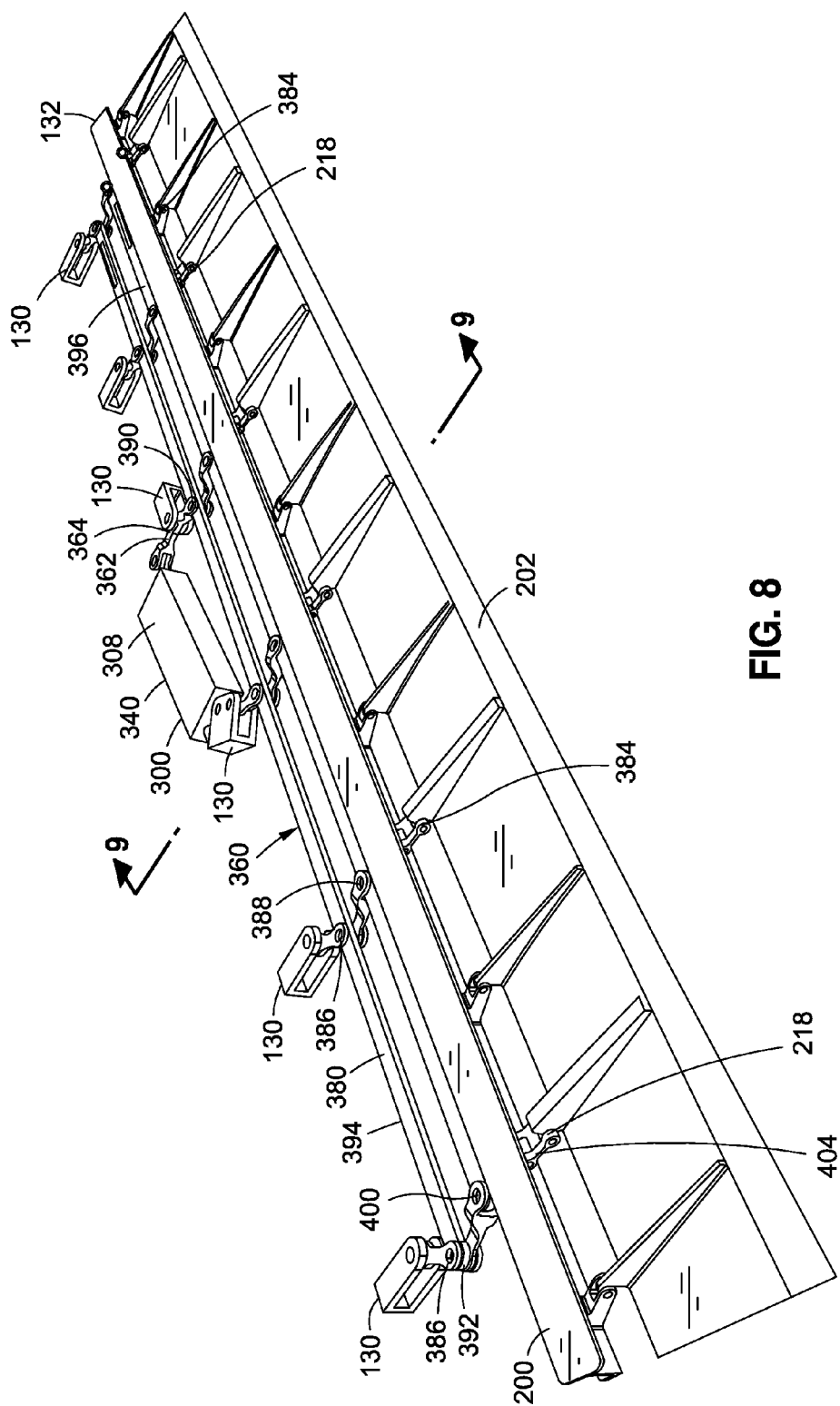
FIG. 8 is a perspective view of the adaptive trailing edge system of FIG. 7.
Figure 9:
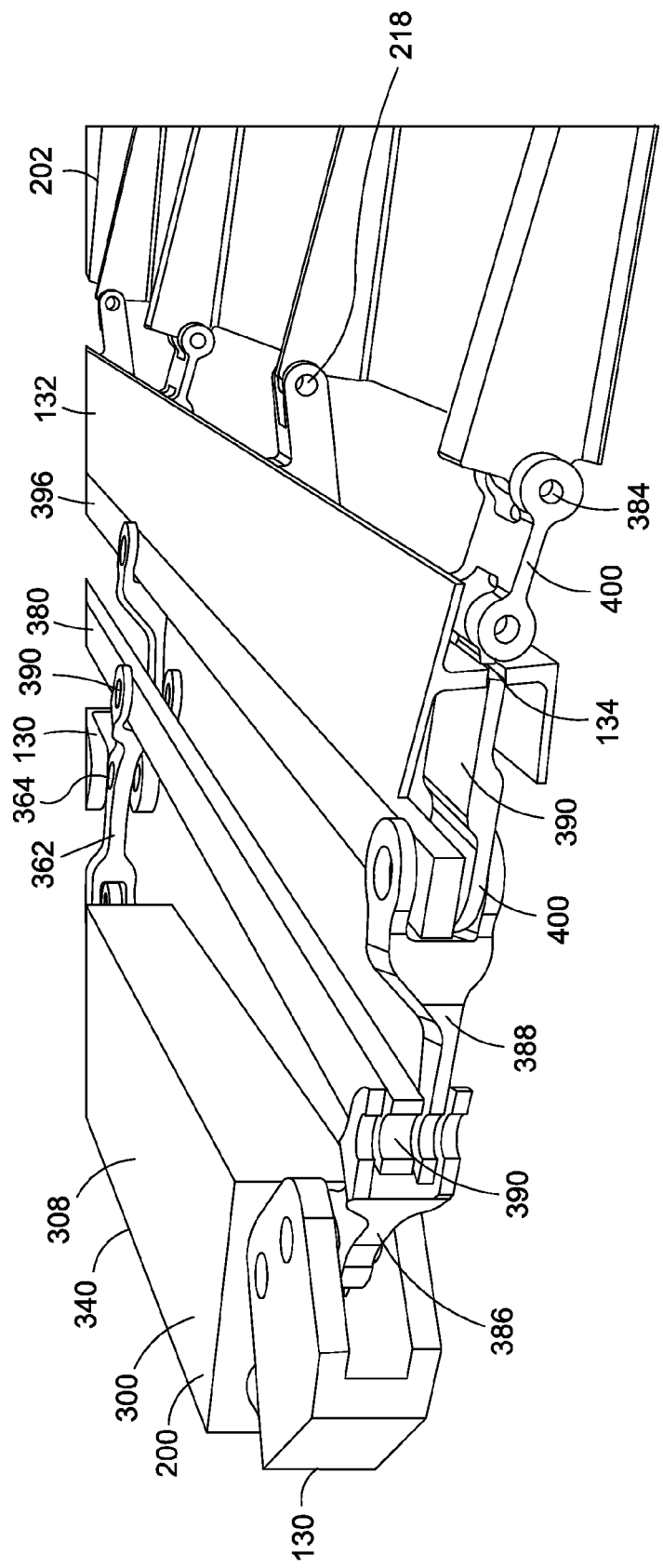
FIG. 9 is a sectional perspective view of the slider mechanism linkage system taken along line 9 of FIG. 8.

In FIG. 7, shown is a plan view of an embodiment of the adaptive trailing edge system 200 mounted to the trailing edge 124. The adaptive trailing edge element 202 may be coupled to the trailing edge 124 by one or more element hinge joints 218 defining a hinge axis 220 for the adaptive trailing edge element 202. In the embodiment shown, the electric motor actuator 300 is configured as a ball screw actuator 340. The ball screw actuator 340 may be coupled to the adaptive trailing edge element 202 by a slider mechanism 380 as is also shown in FIGS. 5-6. The slider mechanism 380 may include a bellcrank 362 (FIG. 8-9) that may be pivotable about a bellcrank pivot axis 364 (FIG. 8-9). The bellcrank 362 may be pivotably mounted to the trailing edge structure 130 of the trailing edge 124. For the slider mechanism 380, the bellcrank pivot axis 364 may be oriented generally transverse (e.g., generally vertically oriented) to the element hinge axis 220 of the adaptive trailing edge element 202. The bellcrank 362 may be coupled to a connector link 388 at a bellcrank-connector joint 390.

In FIG. 7, the slider mechanism 380 may include a link connector bar 394 and a slider connector bar 402 for transmitting the actuation force of the electric motor actuator 300 to a plurality of actuation points 384 on the adaptive trailing edge element 202. The actuation points 384 may be located at spaced intervals along the adaptive trailing edge element span 214. The link connector bar 394 may be supported by one or more support links 386 attached to the trailing edge structure 130. The link connector bar 394 may be oriented generally parallel to the adaptive trailing edge element span 214. During actuation of the electric motor actuator 300, pivoting of the bellcrank 362 may cause the link connector bar 394 to be translated along a lengthwise direction of the link connector bar 394, and along a transverse direction (e.g., perpendicular to the lengthwise direction) of the of the link connector bar 394. A plurality of connector links 388 may extend between the link connector bar 394 and the slider connector bar 402. The support links 386 may be coupled to the connector links 388 at a plurality of support-connector joints 392 along a length of the link connector bar 394. A plurality of slider links 396 (FIGS. 8-9) may couple the connector links 388 to the adaptive trailing edge element 202 at a plurality of connector-slider joints 400. The slider links 396 may be interconnected by the slider connector bar 402 which may be oriented generally parallel to the link connector bar 394.

In FIG. 8, shown is perspective view of the adaptive trailing edge system 200 incorporating the slider mechanism 380 embodiment of the linkage system 360 as shown in FIG. 7. The adaptive trailing edge element 202 may be positioned between a pair of adaptive trailing edge elements 202, each of which may be actuated by a dedicated electric motor actuator 300. The slider links 396 may pass through openings 134 formed in the trailing edge spar 132 such as a slot formed in the trailing edge spar 132. The openings 134 in the trailing edge spar 132 may be sized and configured complementary to the slider link 396 geometry (e.g. complementary to the cross-sectional size and shape) such that lateral movement of the slider links 396 is prevented during actuation of the adaptive trailing edge element 202. In this regard, the openings 134 in the trailing edge spar 132 may provide a sliding fit with the slider links 396 in such a manner as to prevent lateral movement of the slider links 396 relative to the trailing edge spar 132. In this regard, lateral movement of the slider connector bar 402 and the slider links 396 may be prevented when the slider links 396 slides in and out of the openings 134 in the trailing edge spar 132. The slider links 396 may be pivotably coupled to the adaptive trailing edge element 202 by an element link 404 that may be coupled to a forward end of the adaptive trailing edge element 202.

FIG. 9 is a perspective view of the slider mechanism 380 linkage system 360 and the interconnection of the link connector bar 394, the slider connector bar 402, and the slider links 396 during actuation of the adaptive trailing edge element 202. Each slider assembly 382 may be comprised of a support link 386, a connector link 388, a slider link 396, and/or an element link 404. The adaptive trailing edge element 202 may be actuated by a series of the slider assemblies 382 located at spaced intervals along the adaptive trailing edge element span 214 and defining the plurality of actuation points 384. By providing a plurality of actuation points 384 along the adaptive trailing edge element span 214, aeroelastic bending of the adaptive trailing edge element 202 within unsupported regions of the adaptive trailing edge element 202 may be minimized, such as between the actuation points 384 and the hinge joints 218.

In an embodiment, the adaptive trailing edge elements 202 may be configured to resist twisting under aerodynamic loading. For example, the mini-plain flap 204 embodiment of the adaptive trailing edge element 202 shown in FIG. 5 may have a plurality of ribs sandwiched between upper and lower skin members (not shown) and configured to provide a torsionally rigid structure to resist aeroelastic bending. The mini-split flap 206 embodiment of the adaptive trailing edge element 202 shown in FIG. 6 may have a skin member configured to be torsionally rigid to resist twisting under aerodynamic loading on unsupported portions of the mini-split flap 206 between the element hinge joints 218 coupling the mini-split flap 206 to the trailing edge 124. It should be noted that the adaptive trailing edge elements 202 are not limited to a mini-plain flap 204 embodiment or a mini-split flap 206 embodiment, and may include alternative configurations such as a multi-element split flap, a divergent trailing edge 124, a morphing trailing edge 124, a Gurney flap, and other configurations for the adaptive trailing edge element 202 which may be actuated by the electric motor actuator 300 disclosed herein.

FIG. 10 shows an embodiment of the adaptive trailing edge system 200 wherein the linkage system 360 is configured as a pivot mechanism 370. The electric motor actuator 300 is shown configured as a ball screw actuator 340 operatively coupled to the adaptive trailing edge element 202 by the bellcrank 362 and a control rod 372. In some examples, a portion of the control rod 372 may protrude outside of the mold line 116 of the movable trailing edge device 150 (e.g., trailing edge flap 152), or outside of the mold line 116 (not shown) of the fixed trailing edge 126 (not shown) of the wing 114. In such examples, a fairing (not shown) may be required to cover the control rod 372 to minimize aerodynamic drag. For the pivot mechanism 370 embodiment of the linkage system 360, the bellcrank 362 may be pivotable about the bellcrank pivot axis 364 which may be oriented generally parallel (e.g., generally horizontally oriented) to the hinge axis 220 of the adaptive trailing edge element 202. As indicated above, the bellcrank 362 may be pivotably mounted to the trailing edge structure 130 of the trailing edge 124. An element pivot arm 216 may be fixedly coupled to the adaptive trailing edge element 202 and may protrude downwardly from the adaptive trailing edge element 202. The control rod 372 may extend between a free end of the element pivot arm 216 and a free end of the bellcrank 362.

FIG. 11 shows a further embodiment of the adaptive trailing edge system 200 wherein the electric motor actuator 300 is provided as a rotary actuator 350 operatively coupled to the adaptive trailing edge element 202 by a pivot mechanism 370. The rotary actuator 350 may have one or more mounting tabs 306 for mounting the rotary actuator 350 to the trailing edge structure 130. The rotary actuator 350 may include a rotatable output shaft 352 directly coupled to a bellcrank 362. In the embodiment shown, the bellcrank 362 may be configured as a pivot arm fixedly coupled to the output shaft 352 of the rotary actuator 350. The rotary actuator 350 may be configured to pivot the bellcrank 362 about the bellcrank pivot axis 364 when the rotary actuator 350 is activated. In FIG. 11, the bellcrank pivot axis 364 is oriented normal to the plane of paper.

Figure 12:
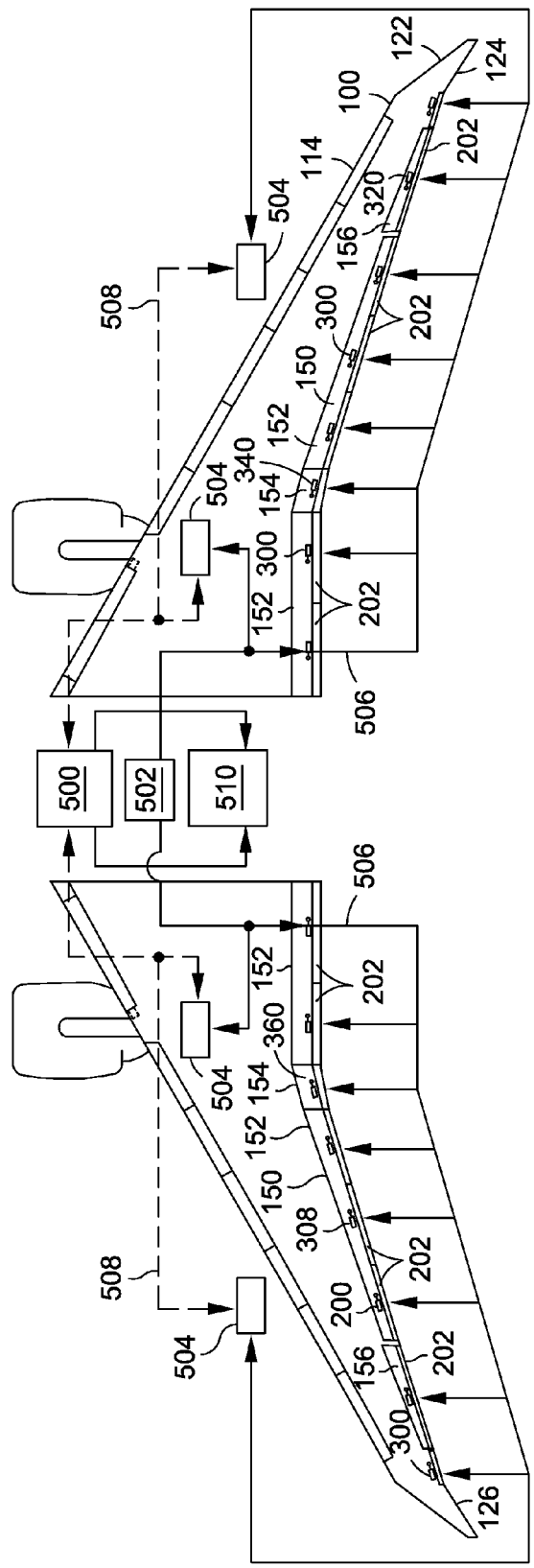
FIG. 12 is a diagrammatic plan view of an aircraft wing having a plurality of adaptive trailing edge systems operatively coupled to a central controller and a central power supply of the aircraft.

FIG. 12 is a diagrammatic view of an aircraft 100 wing 114 having a plurality of adaptive trailing edge elements 202 mounted on the device trailing edges 128 of the trailing edge devices 150, and an adaptive trailing edge element 202 mounted to the fixed trailing edge 126 of the wing 114 at a location outboard 142 of the ailerons 156. The aircraft 100 may include a central controller 500 and a central power supply 502 for providing power and control signals to the electric motor actuators 300. In the embodiment shown, on each wing 114, control of the plurality of adaptive trailing edge systems 200 may be divided among a plurality of remote electronic units 504 (REU). Each one of the remote electronic units 504 may be communicatively coupled to a subset of the electric motor actuators 300. For example, in FIG. 12, one of the remote electronic units 504 on each wing 114 may be communicatively coupled to the adaptive trailing edge systems 200 of the inboard 140 flaps 152 and the flaperon 154. The remaining remote electronic unit 504 may be communicatively coupled to the adaptive trailing edge systems 200 of the outboard 142 flaps 152, the aileron 156, and the fixed trailing edge 126 portion of the wing 114. Power to the remote electronic units 504 may be provided by the central power supply 502 via one or more electric supply lines 506. In addition, power to the electric motor actuators 300 may be provided by the central power supply 502 via the electric supply lines 506 in the manner illustrated. The power switching 510 module may be configured to control the distribution of power to the remote electronic units 504 and to the individual electric motor actuators 300.

Figure 13:
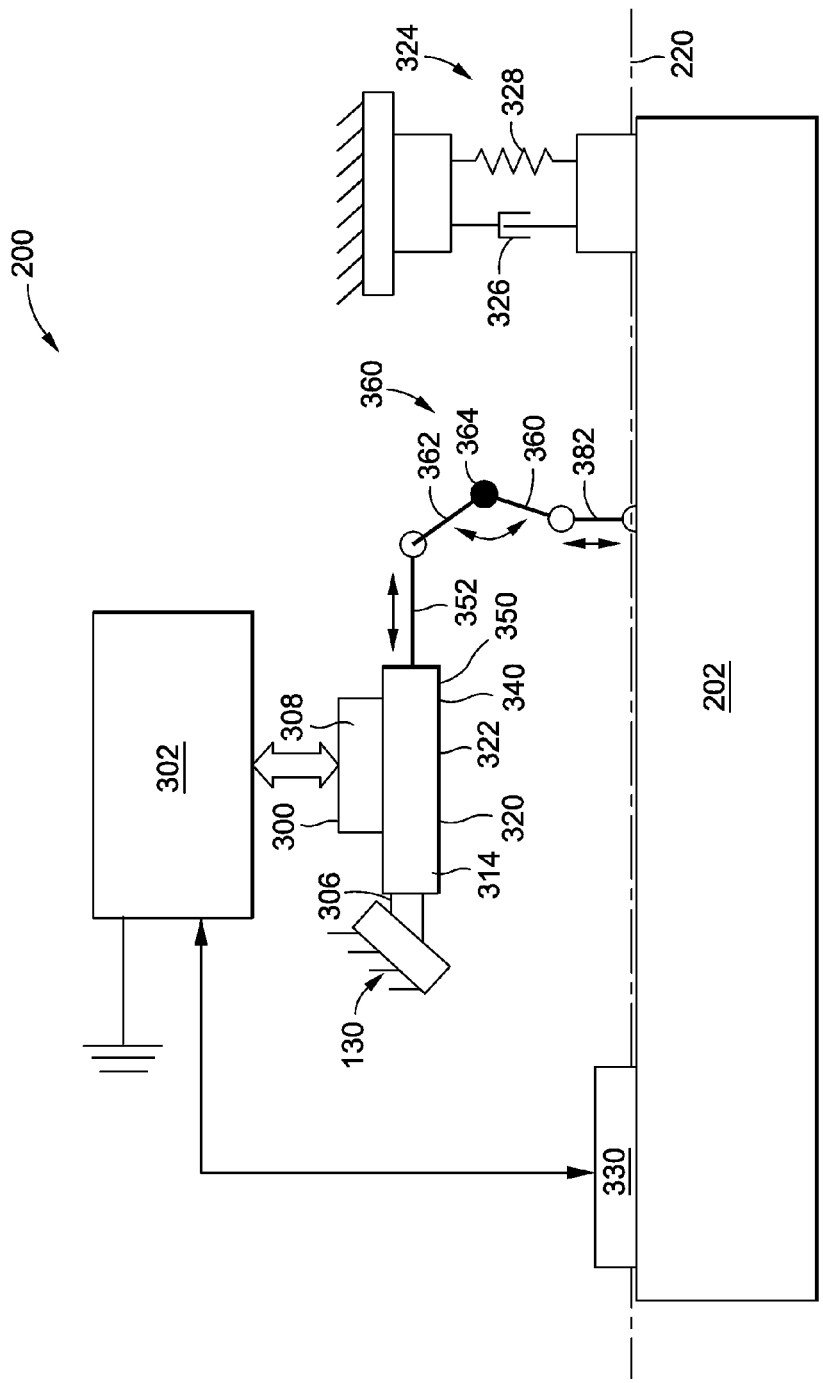
FIG. 13 is a schematic view of an embodiment of the adaptive trailing edge system illustrating a motor control unit communicatively coupled to an electric motor actuator and further including a damper coupled to the adaptive trailing edge element.

FIG. 13 is a schematic view of an embodiment of an adaptive trailing edge system 200 wherein the electric motor actuator 300 is configured as a ball screw actuator 340. In other examples, the electric motor actuator 300 may be configured as a rotary actuator 350 or other suitable actuation device. The ball screw actuator 340 may be coupled to the adaptive trailing edge element 202 by means of the linkage system 360 which may include the bellcrank 362. The adaptive trailing edge system 200 may include a motor control unit 302 for controlling the electric motor actuator 300. The motor control unit 302 may be powered by the central power supply 502 and may receive command signals from the central controller 500 for controlling the electric motor actuator 300. A resolver 330 may be included with the adaptive trailing edge system 200 for monitoring the position of the adaptive trailing edge element 202, and providing signals to the motor control unit 302. The signals may be representative of a desired target position or deflection angle 212 of the adaptive trailing edge element 202. The electric motor actuator 300 may include a position sensor 322 configured to sense the electric motor 308 position and/or the position of the output shaft 352 or threaded shaft 344. Position data provided by the position sensor 322 may be used in conjunction with position information from the resolver to assist in determining the position of the adaptive trailing edge element 202.

In FIG. 13, the electric motor actuator 300 may include a power-off brake 320 that may receive power from the motor control unit 302 for releasing the power-off brake 320. The power-off brake 320 may be coupled to the electric motor 308 and may be configured to prevent rotation of the electric motor 308 when the power-off brake 320 is applied such as during periods when the adaptive trailing edge 124 has been positioned at a desired deflection angle 212. The power-off brake 320 may be released to allow rotation of the electric motor 308 so that the adaptive trailing edge element 202 may be retracted or moved to a different deflection angle. In an embodiment, the adaptive trailing edge system 200 may optionally include a damper 324 mounted to the trailing edge structure 130 and coupled to the adaptive trailing edge element 202. The damper 324 may be configured to dampen vibrations or flutter that may be aerodynamically induced in the adaptive trailing edge element 202. In the embodiment shown, the damper 324 may include a piston/cylinder 326 arrangement and/or a spring 328 arrangement for damping movement of the adaptive trailing edge element 202.

Figure 14:
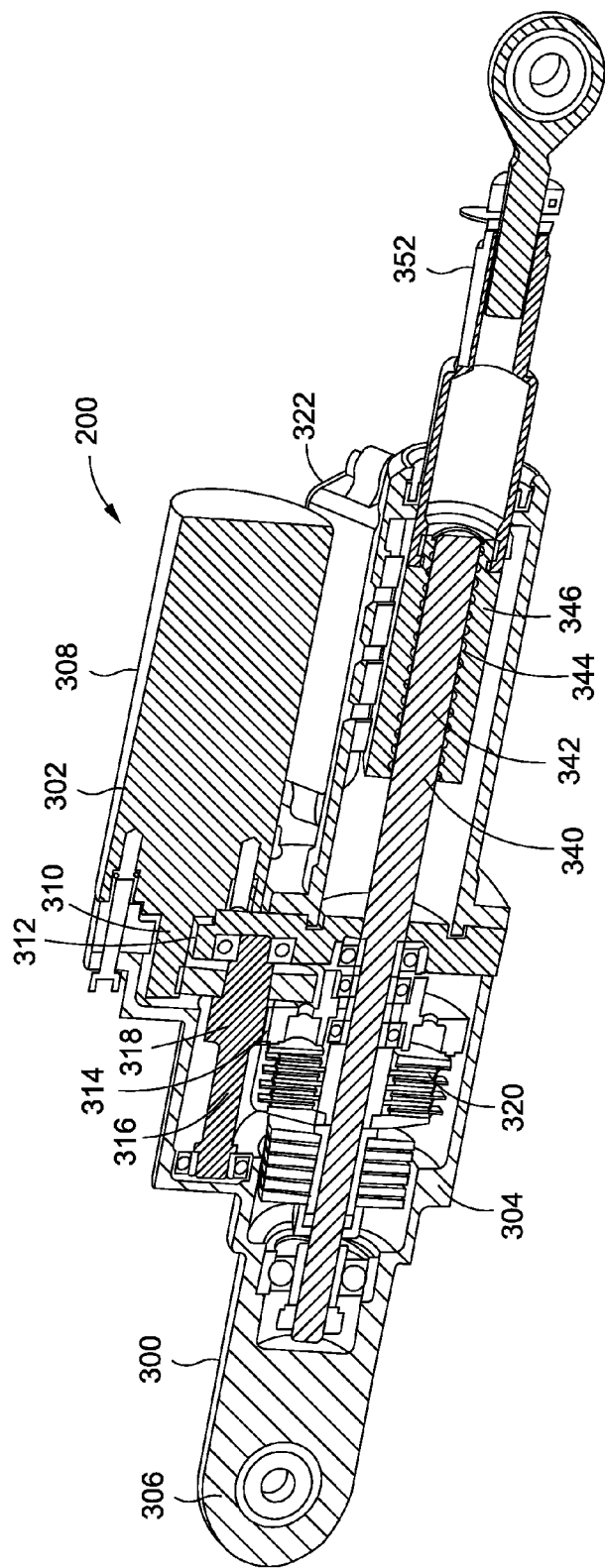
FIG. 14 is a sectional perspective view of an embodiment of a ball screw actuator.

FIG. 14 shows an embodiment of the ball screw actuator 340. The ball screw actuator 340 may include a housing 304 having one or more mounting tabs 306 for mounting the ball screw actuator 340 to the trailing edge structure 130. The electric motor 308 may be coupled to a linear ball screw drive 342 of the ball screw actuator 340 by means of a motor pinion 312 mounted on a motor shaft 310 of the electric motor 308. The motor pinion 312 may engage an inner gear 318 mounted on an inner shaft 316 of a gear system 314 of the ball screw actuator 340. The inner gear 318 may be engaged to a mating gear (not shown) of the power-off brake 320. When the power-off brake 320 is released, power may be provided to the electric motor 308 causing rotation of the threaded shaft 344. The threaded shaft 344 may be engaged to the threaded sleeve 346 for translating the rotational motion of the electric motor 308 into linear motion of the threaded sleeve 346.

In FIG. 14, the threaded sleeve 346 may be coupled to or integrated with the output shaft 352. As was indicated above, the output shaft 352 may include an end fitting to which the bellcrank 362 may be coupled. In this manner, the ball screw drive 342 may cause pivoting of the bellcrank 362 and resulting in actuation of the adaptive trailing edge element 202. Although not shown, the rotary actuator 350 may be configured similar to the ball screw actuator 340 of FIG. 14, with the difference that for the rotary actuator 350, the threaded shaft 344 and threaded sleeve 346 may be omitted, and the rotatable output shaft 352 of the rotary actuator 350 may be directly coupled to the bellcrank 362 for pivoting the bellcrank 362 about the bellcrank pivot axis 364 as shown in FIG. 11.

Figure 15:
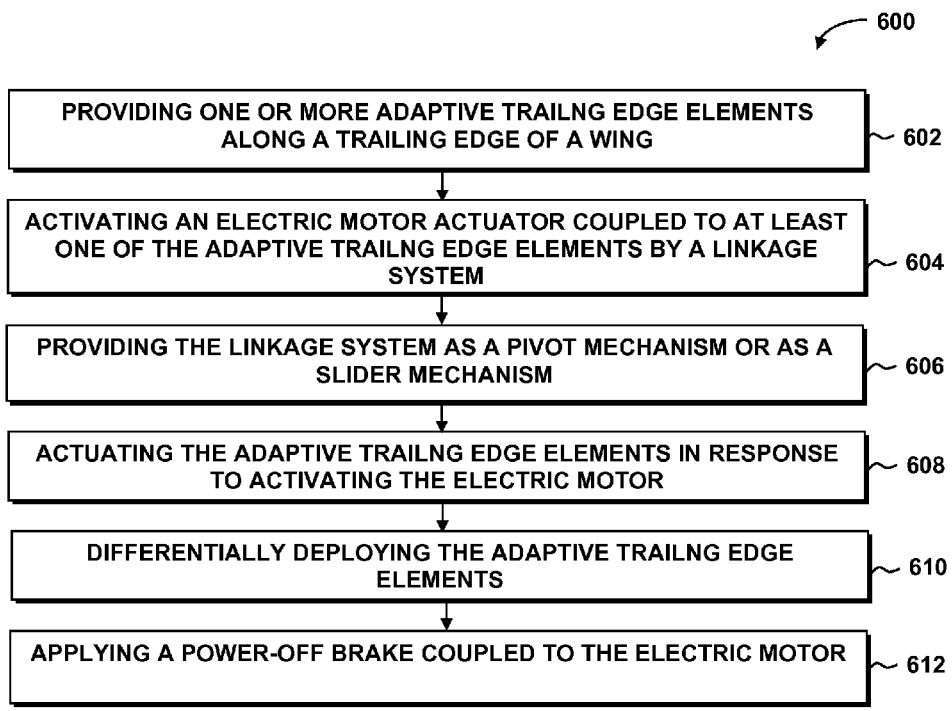
FIG. 15 is an illustration of a flow chart having one or more operations that may be included in a method of actuating a trailing edge element.

In FIG. 15, shown is a flowchart having one or more operations that may be included in a method 600 of actuating an adaptive trailing edge element 202. Step 602 of the method 600 of FIG. 15 may include an optional step of providing one or more adaptive trailing edge elements 202 along a trailing edge 124 of an aircraft 100 wing 114. For example, as shown in FIG. 2, one or more (e.g., four) adaptive trailing edge elements 202 may be mounted to the device trailing edge 128 of the inboard 140 flap 152. Likewise, one or more (e.g., five) adaptive trailing edge elements 202 may be mounted to the device trailing edges 128 of the outboard 142 flaps 152. Although not shown, one or more adaptive trailing edge elements 202 may be mounted to the device trailing edge 128 of the flaperon 154 located between the inboard 140 flap 152 and the outboard 142 flaps 152. In addition, one or more adaptive trailing edge elements 202 may be mounted to each aileron 156 located outboard 142 of the flaps 152.

In an embodiment, one or more of the adaptive trailing edge elements 202 may be mounted to the fixed trailing edge 126 of the wing 114 such as outboard 142 of the aileron 156. In this regard, it should be noted that the aircraft 100 may be provided in an embodiment where conventional high lift trailing edge devices 150 such as the inboard 140 and outboard 142 trailing edge flaps 152 may be replaced by a series of adaptive trailing edge elements 202 mounted to the fixed trailing edge 126 of the wing 114. In any of the embodiments disclosed herein, the adaptive trailing edge elements 202 may be configured as mini-plain flaps 204 and/or mini-split flaps 206 as shown in FIGS. 5-6, or in other adaptive trailing edge element 202 configurations such as multi-element split flaps 206, Gurney flaps, or in other configurations. In some examples, step 602 may not be included and the method may begin at step 604.

Step 604 of the method 600 of FIG. 15 may include activating the electric motor actuator 300 which may be operatively coupled to the adaptive trailing edge elements 202, for example by a linkage system 360. In this regard, it should be noted that although each adaptive trailing edge element 202 is shown as being coupled to a single, dedicated electric motor actuator 300, the adaptive trailing edge system 200 may be provided in an embodiment wherein two or more adaptive trailing edge elements 202 are coupled to a single electric motor actuator 300. The electric motor actuator 300 may be configured as a ball screw actuator 340, a rotary actuator 350, or other mechanical actuation configurations providing inherently high stiffness to reduce or minimize the need to account for compliance in the electric motor actuator 300.

Step 606 of the method 600 of FIG. 15 may include providing the linkage system 360 as a pivot mechanism 370 or as a slider mechanism 380. As described above, each one of the linkage systems 360 may include a bellcrank 362 having a bellcrank pivot axis 364. For the pivot mechanism 370, the bellcrank 362 may pivot about a bellcrank pivot axis 364 (FIGS. 10-11) that may be oriented generally parallel to the hinge axis 220 of the adaptive trailing edge element 202 such that the bellcrank 362 is rotated within a plane that is generally transverse to the hinge axis 220. For the slider mechanism 380, the bellcrank pivot axis 364 (FIGS. 8-9) may be oriented generally transverse (e.g., generally vertically oriented) to the hinge axis 220 of the adaptive trailing edge element 202 such that the bellcrank 362 is rotated within a plane that is generally parallel to the hinge axis 220.

Step 608 of the method 600 of FIG. 15 may include actuating the adaptive trailing edge 124 in response to activating the electric motor 308 and pivoting the bellcrank 362 about the bellcrank pivot axis 364. Advantageously, the adaptive trailing edge element 202 may be actuated independently of the actuation of the trailing edge device 150 to which the adaptive trailing edge element 202 is mounted. The electric motor actuator 300 may include a position sensor 322 and/or a resolver 330 for sensing a position of the adaptive trailing edge element 202 as indicated above. Position data may be provided to the motor control unit 302 and/or to the central controller 500 from the position sensor 322 and/or the resolver 330 for use in generating command signals. The command signals may be transmitted along one or more command lines 508 for actuating one or more of the adaptive trailing edge elements 202 to a target deflection angle 212.

Step 610 of the method 600 of FIG. 15 may include differentially deploying a plurality of the adaptive trailing edge elements 202. In an embodiment, the adaptive trailing edge elements 202 may be mounted in series along the trailing edge 124 of a wing 114. Differential deployment of the adaptive trailing edge elements 202 may provide a means for varying a wing camber of the wing 114 along a spanwise direction in response to differential deployment of the adaptive trailing edge elements 202. Varying the wing camber may provide a number of aerodynamic performance benefits including, but not limited to, reducing aerodynamic drag, increasing lift, and/or improving spanwise load distribution of the wings 114.

Step 612 of the method 600 of FIG. 15 may include applying the power-off brake 320. As indicated above, each one of electric motor actuators 300 may include a power-off brake 320 that may be coupled to the electric motor 308. Power is removed from the power-off brake 320 when the electric motor 308 is non-activated to prevent movement of the adaptive trailing edge element 202. Upon receiving a signal from the central controller 500 to actuate the adaptive trailing edge 124 element, the power-off brake 320 may be released by providing relatively low voltage power to the power-off brake 320, and relatively high voltage may be provided to the electric motor 308 such that the adaptive trailing edge element 202 may be actuated. One or more of the steps of the method 600 described above may be optional. In some examples, methods according to the present disclosure may be performed with some of the steps described herein omitted without departing from the scope of the present disclosure.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A trailing edge system, comprising:
a trailing edge element pivotably mounted to an element hinge axis via an element hinge joint fixedly coupled to a free edge of a movable trailing edge of an airfoil and preventing translation of the trailing edge element relative to the movable trailing edge;
an electric motor actuator including an electric motor configured to actuate the trailing edge element;
a slider mechanism coupling the electric motor actuator to the trailing edge element and pivotably deflecting the trailing edge element upwardly and downwardly independent of actuation of the movable trailing edge, movement of the trailing edge element limited to pivoting movement relative to the movable trailing edge, the slider mechanism including:
a bellcrank coupled to the electric motor actuator and pivotable about a bellcrank pivot axis oriented transverse to the element hinge axis;
a connector link oriented transverse to the element hinge axis and coupled to the bellcrank at a bellcrank-connector joint; and
a slider link coupled to the connector link at a connector-slider joint, the slider link passing through a trailing edge spar and coupled to the trailing edge element for pivoting the trailing edge element about the element hinge axis.

2. The trailing edge system of claim 1, wherein the slider mechanism further includes:
a connector link coupled to the bellcrank at a bellcrank-connector joint;
a slider link coupled to the connector link at a connector-slider joint, and
the slider link passing through a trailing edge spar and coupled to the trailing edge element.

3. The trailing edge system of claim 1, wherein:
the electric motor actuator is configured as one of a ball screw actuator and a rotary actuator.

4. The trailing edge system of claim 3, wherein:
the ball screw actuator includes a linear ball screw drive coupled to a bellcrank for pivoting the bellcrank about a bellcrank pivot axis.

5. The trailing edge system of claim 3, wherein:
the rotary actuator has a rotatable output shaft directly coupled to a bellcrank for pivoting the bellcrank about a bellcrank pivot axis.

6. The trailing edge system of claim 1, further comprising:
a power-off brake configured to prevent rotation of the electric motor when the power-off brake is applied.

7. The trailing edge system of claim 1, wherein:
the trailing edge element comprises one of a mini-plain flap and a mini-split flap.

8. An aircraft, comprising:
a wing;
a trailing edge element pivotably mounted to an element hinge axis via an element hinge joint fixedly coupled to a free edge of a movable trailing edge of the wing and preventing translation of the trailing edge element relative to the movable trailing edge;
an electric motor actuator including an electric motor configured to actuate the trailing edge element;
a slider mechanism coupling the electric motor actuator to the trailing edge element and pivotably deflecting the trailing edge element upwardly and downwardly independent of actuation of the movable trailing edge, movement of the trailing edge element limited to pivoting movement relative to the movable trailing edge, the slider mechanism including:
    a bellcrank coupled to the electric motor actuator and pivotable about a bellcrank pivot axis oriented transverse to the element hinge axis;
    a connector link oriented transverse to the element hinge axis and coupled to the bellcrank at a bellcrank-connector joint; and
    a slider link coupled to the connector link at a connector-slider joint, the slider link passing through a trailing edge spar and coupled to the trailing edge element for pivoting the trailing edge element about the element hinge axis.

9. A method of actuating a trailing edge element, comprising the steps of:
activating an electric motor actuator coupled to a trailing edge element, the trailing edge element pivotably mounted to an element hinge axis via an element hinge joint fixedly coupled to a free edge of a movable trailing edge of an aircraft wing and preventing translation of the trailing edge element relative to the movable trailing edge, and the electric motor actuator coupled to the trailing edge element by a slider mechanism;
pivotably deflecting the trailing edge element upwardly and downwardly in response to activating the electric motor actuator and independent of actuation of the movable trailing edge, movement of the trailing edge element limited to pivoting movement relative to the movable trailing edge, the slider mechanism including:
    a bellcrank coupled to the electric motor actuator and pivotable about a bellcrank pivot axis oriented transverse to the element hinge axis;
    a connector link oriented transverse to the element hinge axis and coupled to the bellcrank at a bellcrank-connector joint; and
    a slider link coupled to the connector link at a connector-slider joint, the slider link passing through a trailing edge spar and coupled to the trailing edge element for pivoting the trailing edge element about the element hinge axis.

10. The method of claim 9, wherein the trailing edge element is one of a plurality of trailing edge elements disposed along a trailing edge of the aircraft wing, the method further comprising:
differentially deploying one or more of the plurality of the trailing edge elements; and
varying a wing camber along a spanwise direction of the aircraft wing in response to differentially deploying the trailing edge elements.

11. The method of claim 9, wherein the step of pivotably deflecting the trailing edge element comprises:
pivotably deflecting one of a mini-plain flap and a mini-split flap.

12. The method of claim 9, further including:
pivoting the bellcrank about the bellcrank pivot axis; and
actuating the trailing edge element in response to pivoting the bellcrank about the bellcrank pivot axis.

13. The method of claim 9, further comprising:
preventing rotation of the electric motor actuator by applying a power-off brake coupled to the electric motor actuator.

14. The method of claim 9, further comprising:
damping movement of the trailing edge element using at least one of a piston/cylinder, a spring, and a mass balance.

15. The trailing edge system of claim 1, further comprising:
a damper mounted to the movable trailing edge and coupled to the trailing edge element and configured to dampen vibrations aerodynamically induced in the trailing edge element, the damper comprising at least one of a piston/cylinder, a spring, and a mass balance.

* * * * *